(12) United States Patent
Tavakkoli et al.

(10) Patent No.: US 12,143,497 B2
(45) Date of Patent: Nov. 12, 2024

(54) TRUSTED VIDEO STREAMING METHOD DEVELOPED USING BLOCKCHAIN TECHNOLOGY ON MOBILE DEVICES

(71) Applicant: Istanbul Teknik Universitesi, Istanbul (TR)

(72) Inventors: Nasim Tavakkoli, Istanbul (TR); Enver Ozdemir, Istanbul (TR); Gunes Zeynep Karabulut Kurt, Istanbul (TR)

(73) Assignee: Istanbul Teknik Universitesi, Istanbul (TR)

( * ) Notice: Subject to any disclaimer, the term of this patent is extended or adjusted under 35 U.S.C. 154(b) by 354 days.

(21) Appl. No.: 17/502,096

(22) Filed: Oct. 15, 2021

(65) Prior Publication Data

US 2022/0173905 A1    Jun. 2, 2022

(30) Foreign Application Priority Data

Nov. 27, 2020  (TR) ................................ 2020/19200

(51) Int. Cl.
| | |
|---|---|
| *H04L 9/32* | (2006.01) |
| *H04L 9/00* | (2022.01) |
| *H04L 67/104* | (2022.01) |
| *H04N 21/414* | (2011.01) |

(52) U.S. Cl.
CPC .......... *H04L 9/3236* (2013.01); *H04L 67/104* (2013.01); *H04N 21/41407* (2013.01); *H04L 9/50* (2022.05)

(58) Field of Classification Search
CPC ...... H04L 67/104; H04L 9/50; H04L 2209/80
See application file for complete search history.

(56) References Cited

U.S. PATENT DOCUMENTS

| | | | |
|---|---|---|---|
| 11,308,185 B1 * | 4/2022 | Paczkowski | ............... H04L 9/50 |
| 2008/0022084 A1 * | 1/2008 | Raftelis | ................ H04L 9/3236 |
| | | | 713/153 |
| 2017/0155927 A1 * | 6/2017 | Wei | ....................... H04N 21/234 |
| 2018/0101560 A1 * | 4/2018 | Christidis | ............. H04L 9/3236 |
| 2020/0084022 A1 * | 3/2020 | Winarski | ............... G06F 21/602 |
| 2020/0159891 A1 * | 5/2020 | Patel | ........................ G06F 21/16 |
| 2020/0372184 A1 * | 11/2020 | Meirosu | ................ H04L 9/3247 |

FOREIGN PATENT DOCUMENTS

| | | |
|---|---|---|
| CN | 109194481 A | 1/2019 |
| CN | 109766673 A | 5/2019 |
| WO | WO-2020022958 A1 * | 1/2020 |

* cited by examiner

*Primary Examiner* — Philip J Chea
*Assistant Examiner* — James Ross Hollister
(74) *Attorney, Agent, or Firm* — Bayramoglu Law Offices LLC

(57) ABSTRACT

A reliable video streaming method using blockchain technology resisting cyber-attacks such as external and DDOS, malware, virus, and bandwidth reduction during video streaming of mobile devices connected over a same network is provided. The reliable video streaming method enables mobile devices connected to each other over a network to stream video over a reliable network.

1 Claim, No Drawings

TRUSTED VIDEO STREAMING METHOD DEVELOPED USING BLOCKCHAIN TECHNOLOGY ON MOBILE DEVICES

CROSS REFERENCE TO THE RELATED APPLICATIONS

This application is based upon and claims priority to Turkish Patent Application No. 2020/19200, filed on Nov. 27, 2020, the entire contents of which are incorporated herein by reference.

TECHNICAL FIELD

The invention relates to a reliable video streaming method using blockchain technology that can resist cyber-attacks such as external distributed denial of service (DDOS), malware, virus, and bandwidth reduction during video streaming of mobile devices connected over the same network.

BACKGROUND

Recent advances in network technology and the rapid growth of the digital content industry are making multimedia services, especially video streaming services, increasingly popular among subscribers. Most video streaming applications involve distributing the video separately from a source server to each of the users. The client-server model can only work well with a reasonable number of users. The requests of crowds over a certain number can easily crash the video server, resulting in a scalability problem for this reason. In addition, different factors can affect the speed that wireless network (Wi-Fi) or 4G connectivity provides in video streaming on the user side.

The use of cache with peer-to-peer (P2P) technology has become a popular solution for video streaming applications in order to prevent such problems. A client serves as a receiver for downloading packets from a server or peer nodes in P2P networks while distributing the downloaded packets to other peer nodes at the same time. The bandwidth of the peer nodes is efficiently loaded into the network, and the load of the server is relieved in this way. System capacity increases as receiving peers join the network since they are also potential senders for other peers, and this solves the scalability problem in a less costly way. The caching method with P2P reduces the load as the number of users increases, even though a load of content providers and 4G service providers increases proportionally as the number of users increases in the current situation.

Applications that share caches over P2P technology are not secure and are vulnerable to cyber attacks such as DDOS, malware, virus, or bandwidth reduction even though they offer a suitable solution for video streaming. The contents of packets distributed between the same nodes over the P2P network are not controlled; therefore, these packets may contain malware.

Various methods have been developed in the art of reliable video streaming.

The Chinese patent document CN109194481A, which is state of the art, mentions a method and a device for increasing the security of the user's blockchain network and for verifying the blockchain identity.

A cloud storage system based on blockchain, and quantum flow data block technology is mentioned in the Chinese patent document CN109766673A, which is in the known state of the art.

The method for transaction verification in a blockchain-based network is mentioned in the International patent document WO2020022958, which is in the known state of the art.

There is a need to develop a new method that enables mobile devices connected to each other over the network to stream video over a reliable network, prevents the distribution of malicious packets over the network, authenticates the nodes connected to the P2P network, and also controls the content of the distributed video packets when the methods in the art are examined.

SUMMARY

The object of the present invention is to realize a method that enables mobile devices connected to each other over a network to stream video over a reliable network.

Another object of the present invention is to realize a method by which the distribution of malicious packets over the network is prevented.

DETAILED DESCRIPTION OF THE EMBODIMENTS

The inventive streaming method establishes a P2P network through which mobile devices can connect to each other and share their buffered data during live streaming over the P2P network. Devices that are part of a network need to trust each other when exchanging packets to prevent these from receiving malicious packets from a malicious device. Blockchain technology is used to provide network security and an authentication method in the method of the invention. Private Blockchain is used in the designed method since speed is an important factor during packet transfer between devices.

Each video packet downloaded from the server must be approved by the verification nodes in the chain before they can be transferred to devices (nodes) on the network, so no malicious packets are added to the chain.

Each node receives the updated version of blockchain data from other nodes in the network when they join the network. Blockchain data includes the hash value of packets downloaded by each node in the network during video streaming. The hash value is calculated based on the selected hash function ($H(\bullet)$). For instance, functions defined in SHA1, SHA2, SHA3, or MD5 algorithms can be used as $H((\bullet))$. It also contains a list of the number of packets that each node downloads and the sender/receiver nodes, and the information of video segments. For example, the list shows that the X node contains packets X: $\{P_1, P_2, P_4, P_5, P_8\}$, $P_1$, $P_2$, $P_4$, $P_5$ and $P_8$, and the Y node contains packets Y: $\{P_2, P_3, P_7, P_9\}$, $P_2$, $P_3$, $P_7$, and $P_9$.

Here;
$P_1$, (1st video packet downloaded)
$P_2$, (2nd video packet downloaded)
$P_4$, (4th video packet downloaded)
$P_5$, (5th video packet downloaded)
$P_6$, (6th video packet downloaded)
$P_7$, (7th video packet downloaded)
$P_8$, (8th video packet downloaded)
H(p) (Hash value of the downloaded video packet)
H(p_x) (Hash value of the downloaded the xth video packet).

Thus, the nodes send requests to other nodes for each segment of the video according to the list. The nodes receiving the request send the desired packets to the devices over the P2P network. Afterward, each device calculates the hash value of received packets and compares it with the hash value of the corresponding packet in the chain. The device ensures that it receives the correct packet that does not contain malware as long as the two hash values are equal.

The Hash value of each data is different, unique, and specific to that data here. Therefore, the same value should be obtained when the Hash value of each packet is calculated by different devices. Therefore, the Hash value of each packet in the network and the Hash value calculated by the node should be the same.

As an example, node Z sends a request to node X for packets $P_1$, $P_2$, $P_4$, $P_5$ and sends a request to node B for packets $P_2$, $P_3$, $P_7$. After receiving packets from nodes X and Y, node Z calculates the H(p) value for each packet and compares it with the hash value of the corresponding packet in the chain. Node Z makes sure that it receives the correct packet as long as the two hash values are the same.

The verification nodes decide whether the block can be added to the chain when nodes on the network want to add the hash value of the video packets they downloaded from the server to the chain as a new block. For instance, when a node caches the p_x packet during streaming, it calculates the H(p_x) value and sends the hash value to the verification nodes. Verification nodes access the p_x packet through the source server, calculate the H(p_x) value, and compare the two hash values. H(p_x) is added to the chain as a new block if the responsible nodes verify the p_x packet. It should be noted that the block does not contain the packet itself but only the unique constant size value calculated by a hash function and the hash value in which it defines the packet.

The new block contains the Hash value of the video packet. Since the approving node has the Hash value of the correct video packet, it compares the Hash value sent to it with the Hash value is calculated. If both values are the same, it understands that it is the correct packet and approves the addition of the new block. If the Hash values are not the same, it understands that the node wants to add a different packet and does not allow the addition of a new block.

The method of the invention comprises the following steps;
  connecting the device (node) to the network,
  obtaining the latest data of the blockchain in the network,
  sending requests to nodes in the network to receive video segments,
  calculating the H(p) value of the sent video segment,
  comparing the calculated value with the H(p) value (hash value of the packet) in the chain,
  trying to add new blocks to the blockchain by the nodes in the network,
  controlling and approving the new block by the controller node,
  rejecting the new block by the controller node, and trying to add a new block again, by the nodes, if there is a block containing malicious data,
  adding a new block to the blockchain in the network and updating the blockchain list.

The bandwidth of the peer nodes is efficiently loaded to the network, and the load of the server is relieved thanks to the method of the invention. System capacity increases as receiving peers join the network since they are also potential senders for other peers, and this solves the scalability problem in a less costly way. The caching method with P2P reduces the load as the number of users increases, even though a load of content providers and 4G service providers increases proportionally as the number of users increases in the current situation.

What is claimed is:

1. A reliable video streaming method using a blockchain technology on mobile devices, comprising:
  connecting a first device to a network with a wireless network connection;
  obtaining, by the first device, latest data of a blockchain in the network, wherein said latest data comprises a first hash value, disposed in the blockchain, calculated by applying a hash function to a first data packet that is a video streaming packet;
  sending, by the first device, a request to a first node in the network to receive the first data packet in accordance with a peer-to-peer video distribution scheme;
  receiving, by the first device in accordance with the peer-to-peer video distribution scheme, a second data packet from the first node in response to said sending the request to the first node in the network to receive the first data packet that is the video streaming packet;
  calculating, by the first device, a second hash value of the second data packet by applying said hash function to said second data packet;
  comparing, by the first device, the second hash value with the first hash value and, in response to determining that the first hash value and the second hash value match, verifying that said second data packet is the first data packet requested by the first device;
  attempting to add new blocks by a plurality of nodes, including the first node, in the network to the blockchain, and
  controlling and approving the new blocks by an approver node when the new blocks do not contain malicious data;
  rejecting the new blocks by the approver node, and trying to add the new blocks again, by the plurality of nodes, when the new blocks contain the malicious data; and
  adding the new blocks to the blockchain in the network when the new blocks do not contain malicious data and updating a blockchain list.

\* \* \* \* \*